United States Patent [19]

Yamakawa

[11] 3,845,237

[45] Oct. 29, 1974

[54] SYSTEM FOR RECORDING AND/OR REPRODUCING COLOR TELEVISION SIGNALS

[75] Inventor: Kiyoshi Yamakawa, Tokyo, Japan

[73] Assignee: Sony Corporation, Tokyo, Japan

[22] Filed: Jan. 26, 1973

[21] Appl. No.: 327,614

[52] U.S. Cl. .......................................... 358/4
[51] Int. Cl. .......................... H04n 9/02, H04n 5/78
[58] Field of Search .......... 178/5.4 P, 5.4 C, 5.4 CD

[56] References Cited

UNITED STATES PATENTS

| | | | |
|---|---|---|---|
| 3,715,469 | 2/1973 | Tamaru | 178/5.4 P |
| 3,721,753 | 3/1973 | Mima | 178/5.4 P |
| 3,723,638 | 3/1973 | Fujita | 178/5.4 CD |

*Primary Examiner*—Robert L. Richardson
*Assistant Examiner*—Mitchell Saffian
*Attorney, Agent, or Firm*—Lewis H. Eslinger; Alvin Sinderbrand, Esq.

[57] ABSTRACT

A system capable of recording and/or reproducing color television signals formed in accordance with any of the existing color television standards, such as, the NTSC standard and the PAL standard, includes a magnetic recording and/or reproducing apparatus having rotary magnetic heads for recording or reproducing signals on a magnetic medium, such as a magnetic tape, and in which, for recording, the color sub-carrier frequency of the received signal is converted to a first predetermined frequency, irrespective of the original color sub-carrier frequency characteristic of the color television standard with which the original or received signal was formed, and the rotational speed of the heads is selectively determined in accordance with the field frequency characteristic of the color television standard of the received signal, whereas, for reproducing the recorded signal, the heads are rotated at the same speed as for recording and the color sub-carrier frequency of the reproduced signal is reconverted to a second predetermined frequency irrespective of the original color sub-carrier frequency. The recording and/or reproducing system further includes a display apparatus for displaying color images corresponding to the reproduced signal from the recording and/or reproducing apparatus, and in which selectively operable circuits are provided for demodulating the chrominance signal included in the reproduced signal, and thereby obtaining color difference signals, in accordance with the phase relationship of such color difference signals on the color sub-carrier which is characteristic of the color television standard of the original signal.

15 Claims, 13 Drawing Figures

PATENTED OCT 29 1974 3,845,237

SHEET 2 OF 4

PATENTED OCT 29 1974

3,845,237

SHEET 3 OF 4

SYSTEM FOR RECORDING AND/OR REPRODUCING COLOR TELEVISION SIGNALS

BACKGROUND OF THE INVENTION

1. Field of the Invention

This invention relates generally to systems for magnetically recording and/or reproducing color television signals, and more particularly to such systems which are capable of recording and/or reproducing color television signals formed according to different standards, such as the NTSC standard and the PAL standard, which have, for example, different field frequencies and different color subcarrier frequencies, so that it has been considered practically impossible to record and reproduce such signals by means of a common system.

2. Description of the Prior Art

At present, the so-called NTSC system or standard is employed for color television transmissions in Japan, the United States of America, Canada, Mexico and so on, while the so-called PAL system or standard is employed in most European countries. When color television signals produced in accordance with the different color television standards or systems now employed are compared, these signals are found to have important characteristic differences. Thus, the field frequency of a color television signal formed according to the NTSC system is 60 Hz, but that of a color television signal formed according to the PAL system is 50 Hz; the number of the horizontal scanning lines is 525 in the NTSC system and 625 in the PAL system; the color subcarrier frequency is about 3.57 MHz in the NTSC system and about 4.43 MHz in the PAL system; and, in respect to the interleaving relation between the luminance and chrominance signals, the NTSC system employs a ½ line offset while the PAL system has ¼ line offset. Further, in the NTSC system, the two quadrature modulation axes, that is, the (B-Y) axis and (R-Y) axis of the color subcarrier which is modulated with the respective color signals, are fixed in phase and the burst signal always coincides in phase with the -(B-Y) axis. On the other hand, in the PAL system one of the two quadrature axes, for example, the (R-Y) axis, is reversed in phase at alternate line intervals and the burst signal, which is advanced in phase by 135° for the (B-Y) axis, is transmitted during the line interval within which the color subcarrier is modulated with the red color difference signal at the (R-Y) axis, whereas the burst signal, which is retarded in phase by 135° for the (B-Y) axis, is transmitted during the line interval within which the color subcarrier is modulated with the red color difference signal at the -(R-Y) axis. Further, the horizontal or line frequency is 15.75 KHz in the NTSC system and 15.63 KHz in the PAL system, and the horizontal period is 63.5 microseconds in the NTSC system and 64 microseconds in the PAL system.

By reason of the above differences between color television signals formed in accordance with the NTSC and PAL standards or systems, it has been quite difficult to provide a common recording and/or reproducing system for signals produced in accordance with both standards and prior attempts to provide such a common recording and/or reproducing system have sought to transform a signal according to one standard into a signal according to the other standard with the result that the system becomes complicated in construction and hence in operation.

SUMMARY OF THE INVENTION

In accordance with the present invention, there is provided a common magnetic recording and/or reproducing system which can easily record and/or reproduce color television signals formed according to the different standards, such as the standards of the NTSC and PAL systems, respectively and which makes it possible to display the reproduced signals by means of a single color television receiver or image display device whether the original signals were in accordance with the NTCS or PAL standards.

Therefore, it is an object of this invention to provide a novel system capable of easily recording and/or reproducing magnetically color television signals formed in accordance with different standards, such as the standards of the NTSC system and the PAL system.

Another object of this invention is to provide a magnetic recording and/or reproducing system that can be employed in connection with different color television signals, and which includes a so-called video tape recorded (VTR) adapted to have selected operating conditions consistent with the standard or system of the input color television signal so as to be capable of recording and/or reproducing either NTSC or PAL color television signals, and an image display device, such as a television receiver, for displaying either NTSC or PAL color television signals as reproduced by the video tape recorder.

The above, and other objects, features and advantages of this invention, will be apparent from the following description of illustrative embodiments which is to be read in conjunction with the accompanying drawings.

DESCRIPTION OF THE PREFERRED EMBODIMENTS

Figure 1:
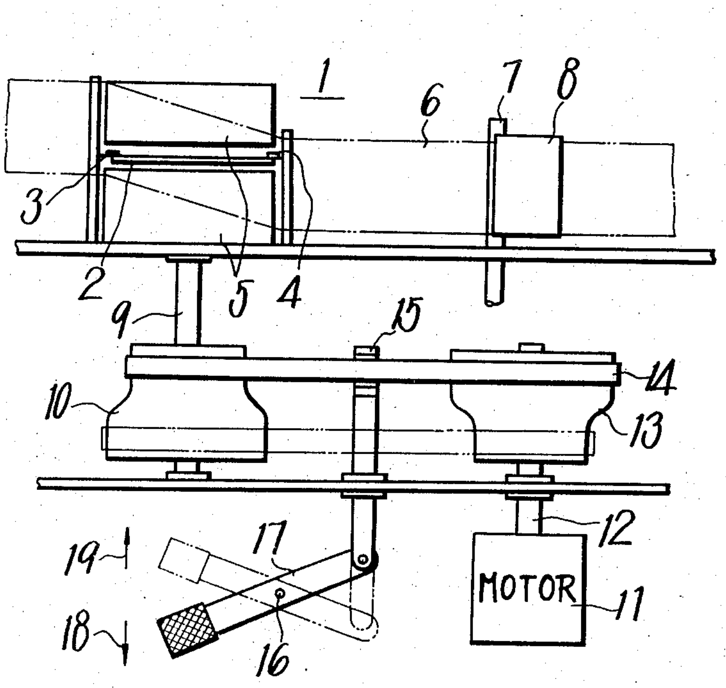
FIG. 1 is a side elevational view of a part of a magnetic recording and/or reproducing apparatus used in a system according to this invention.

Referring in detail to FIG. 1, it will be seen that a magnetic recording and/or reproducing apparatus included in a system according to this invention may include a rotary magnetic head assembly 1 which is composed of a rotary disk 2 and two magnetic heads 3 and 4 mounted on rotary disk 2 at diametrically opposed locations. The rotary disk 2 with magnetic heads 3 and 4 thereon is disposed within a tape guide drum 5 and a magnetic tape 6 is transported about the outer periphery of tape guide drum 5 in an oblique or helical path through an angular extent of about 180° by the cooperation of a capstan 7 and a pinch roller 8. During the transportation of tape 6, rotary magnetic heads 3 and 4 scan the tape 6 alternately to form respective slant or oblique tracks on the tape 6 for each revolution of disk 2. In other words, during each revolution of rotary disk 2, each of the rotary magnetic heads 3 and 4 forms a respective oblique or slant track on tape 6, and, for example, each oblique or slant track may contain the signals corresponding to one field of the color television picture, with two adjacent tracks containing the signals corresponding to two successive fields, or one frame, of the picture.

A rotary shaft 9 is fixed to rotary disk 2 and carries a stepped pulley 10 which has a small diameter part at its upper portion and a larger diameter at its lower portion. An electric motor 11 has a rotary shaft 12 supporting a stepped pulley 13 which is of large diameter at its upper portion and of small diameter at its lower portion. A belt 14 is stretched between the two pulleys 10 and 13 and is engaged by a belt shifter 15 which, in the illustrated embodiment, is connected at its lower end portion to an operating rod or lever 17 which is, in turn, pivotally supported at its mid-point, as at 16. Accordingly, if the lever 17 is rocked about its pivot 16 in the direction of arrow 18 in FIG. 1, the belt shifter 15 is raised with the result that belt 14 engages pulley 10 at its smaller diameter portion and engages pulley 13 at its larger diameter portion, as shown by full lines on FIG. 1 to rotate heads 3 and 4 at a speed higher than that of motor 11. On the other hand, if lever 17 is rocked in the direction of arrow 19, belt shifter 15 is lowered to make belt 14 engage pulley 10 at its larger diameter portion and pulley 13 at its smaller diameter portion, as shown in broken lines on FIG. 1, with the result that heads 3 and 4 are rotated at a speed lower than that of motor 11.

Accordingly, it will be apparent that, when recording a color television signal according to the NTSC system, that is, with a field frequency of 60 Hz, disk 2 is rotated at a speed of 30 rev. per second by disposing lever 17 in the position shown in broken lines on FIG. 1. On the other hand, when recording a color television signal with a field frequency of 50Hz, as in the PAL system, disk 2 is rotated at a speed of 25 rev. per second by disposing lever 17 at the position shown in full lines on FIG. 1. Thus, either of the standard television signals can be recorded on tape 6 with the signals of each field being included in a respective slant or oblique track. It will be understood that if the disk 2 carrying heads 3 and 4 is rotated at one-half of the speed mentioned above, each oblique or slant track will contain the signals for one frame of the television picture.

In any case, during recording, the rotary heads 3 and 4 are rotated at a speed that is in correspondence with the field frequency of the signals to be recorded. Further, in accordance with this invention, during recording, the color subcarriers are frequency-converted to a first predetermined frequency which is the same irrespective of the color subcarrier frequency of the original signal.

Figure 2:
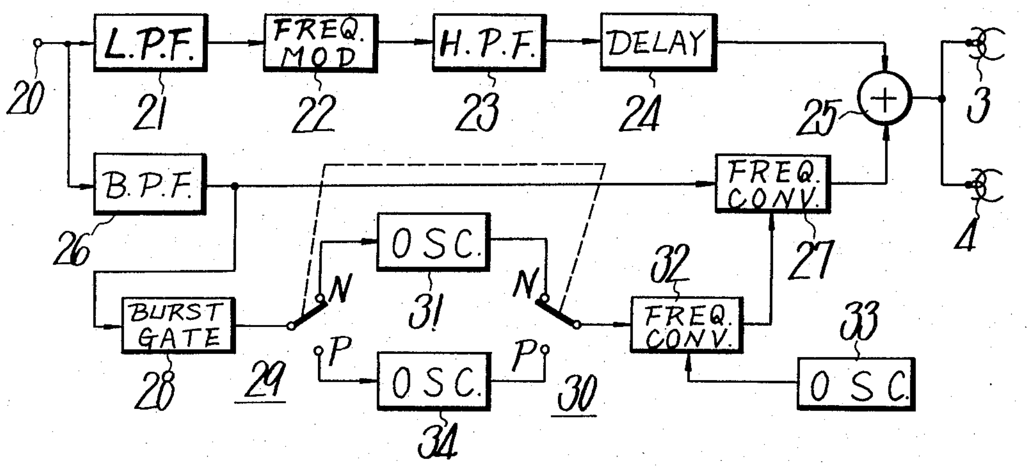
FIG. 2 is a systematic block diagram showing a recording circuit arrangement included in the system according to this invention.
Figure 3:
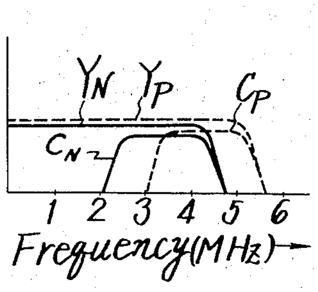
FIGS. 3 and 4 are frequency spectrum diagrams to which reference will be made in explaining the operation of the recording circuit arrangement depicted in FIG. 2.
Figure 4:
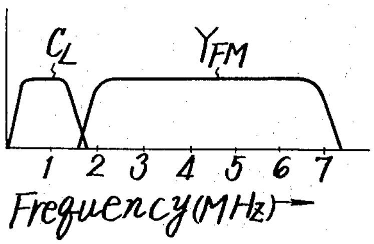

Referring now to FIG. 2, it will be seen that, in the recording circuit arrangement according to the invention as there shown, a color television signal to be recorded is applied to an input terminal 20 and is fed therefrom through a slow-pass filter 21 in which the luminance signal is separated from the color television signal. The luminance signal thus separated is then fed to a frequency modulator 22 to frequency-modulate a carrier signal of a predetermined frequency with the luminance signal. The frequency-modulated luminance signal is applied through a high pass filter 23 and a delay line 24 to a mixer 25. Thus, either the luminance signal $Y_N$ of an NTSC color television signal, as shown in full lines on FIG. 3, or the luminance signal $Y_p$ of a PAL color television signal, as shown by the dotted line on FIG. 3, is made into a frequency-modulated luminance signal $Y_{FM}$ having the same frequency band irrespective of the type of the original signal, as shown in FIG. 4.

The color television signal applied to input terminal 20 is also fed to a band pass filter 26 in which the chrominance signal is separated from the color television signal applied thereto. The separated chrominance signal is fed to a frequency converter 27 and also to a burst gate 28 which separates a burst signal from the signal applied thereto.

When an NTSC color television signal is being recorded, switches 29 and 30 are disposed to engage their respective contacts N, as shown on FIG. 2, so that the burst signal is fed from the burst gate 28 to an oscillator 31 to drive the latter. The oscillator 31 produces a signal with a frequency of 3.58 MHz which is equal to the color subcarrier frequency of the NTSC color television signal. The signal delivered from the oscillator 31 is fed to a frequency converter 32 which also receives a signal with a frequency of 767 KHz from an oscillator 33, so that the frequency converter 32 delivers a signal with a frequency of 4.347MHz (3.58MHZ+767KHz) to frequency converter 27 which then frequency converts or beats down the frequency of the color subcarrier of the separated chrominance signal from 3.58MHz to 767 KHz.

When a PAL color television signal is being recorded, the switches 29 and 30 are disposed to engage or close their respective contacts P for supplying the burst signal from the burst gate 28 to an oscillator 34 which is thereby driven to produce a signal with a frequency of 4.43mHz which is equal to the color subcarrier frequency of the PAL color television signal. The signal produced by oscillator 34 is applied to frequency converter 32, as before, and frequency converter 32 delivers a signal with a frequency of 5.197 MHz (4.43MHz+767KHz) to the frequency converter 27 in which the frequency of the color subcarrier of the separated chrominance signal is converted or beaten down from 4.43MHz to 767KHz, as before. Thus, the chrominance signal $C_N$ of a color television signal according to the NTSC system and a chrominance signal $C_P$ of a color television signal according to the PAL system, as shown in full and broken lines on FIG. 3, are both frequency-converted to the same low frequency band $C_L$, which is centered at 767 KHz, as shown in FIG. 4. The frequency-converted chrominance signal $C_L$ is applied to mixer 25 which is also supplied with the frequency modulated luminance signal $Y_{FM}$, as described above, so that the mixer 25 combines the signal $C_L$ with the signal $Y_{FM}$, and the thus combined signal is fed to magnetic heads 3 and 4, in parallel, to be recorded thereby on magnetic tape 6.

Upon reproduction of the signal thus recorded on tape 6, the rotating speed of magnetic heads 3 and 4 is selected to be the same as that used during recording and the recorded color television signals are reproduced from tape 6 by means of the heads 3 and 4. The color subcarrier in the reproduced color television signal, which was frequency-converted prior to recording as mentioned above, is now further frequency-converted or reconverted to a second predetermined frequency. This second predetermined frequency may be desirably selected to be equal to the original color subcarrier frequency of one of the standard color television signals, for example, the color television signal according to the PAL system.

Figure 5:
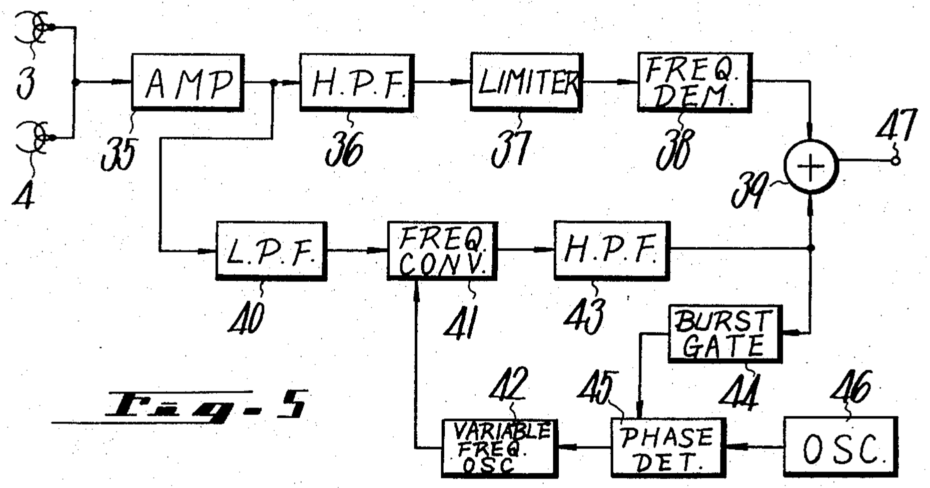
FIG. 5 is a systematic block diagram showing a reproducing arrangement included in the system according to this invention.

Referring now to FIG. 5, it will be seen that, in the reproducing circuit arrangement according to this invention, as there shown, the color television signal reproduced by magnetic heads 3 and 4 is applied through a reproducing amplifier 35 to a high-pass filter 36 by which the frequency-modulated luminance signal $Y_{FM}$ is separated. This separated signal $Y_{FM}$ is fed through a limiter 37 to a frequency demodulator 38 which frequency-demodulates the signal applied thereto. The frequency-demodulated luminance signal is then fed to a mixer 39. The reproduced color television signal passed through amplifier 35 is also fed to a low-pass filter 40 in which the chrominance signal $C_L$ converted to the low frequency band is separated. The separated chrominance signal $C_L$ having a color subcarrier frequency of 767 KHz is then applied to a frequency converter 41 which is also supplied with a signal having a frequency of 5.197MHz from a variable frequency oscillator 42, so that frequency converter 41 frequency-converts the frequency of the color subcarrier to 4.43MHz, whether the original color television signal was in accordance with the NTSC system or the PAL system. The chrominance signal from frequency converter 41 is fed through a high-pass filter 43 to mixer 39 which combines the chrominance signal with the frequency-modulated luminance signal. In the illustrated embodiment, in order to correct any phase error of the color signal, for example, as may be caused by jitter during reproducing, the chrominance signal from high-pass filter 43 is also applied to a burst gate 44 which separates the burst signal from the chrominance signal and applies this separated burst signal to a phase detector 45. The phase detector 45 is also supplied with a reference signal from an oscillator 46 so that the detector carries out a phase-comparison of both the signals applied thereto to detect jitter. If phase deviation, as may be caused by jitter, is detected, a resulting output signal from phase detector 45 is fed to variable frequency oscillator 42 to control the frequency of the signal delivered from the latter.

Figure 6:
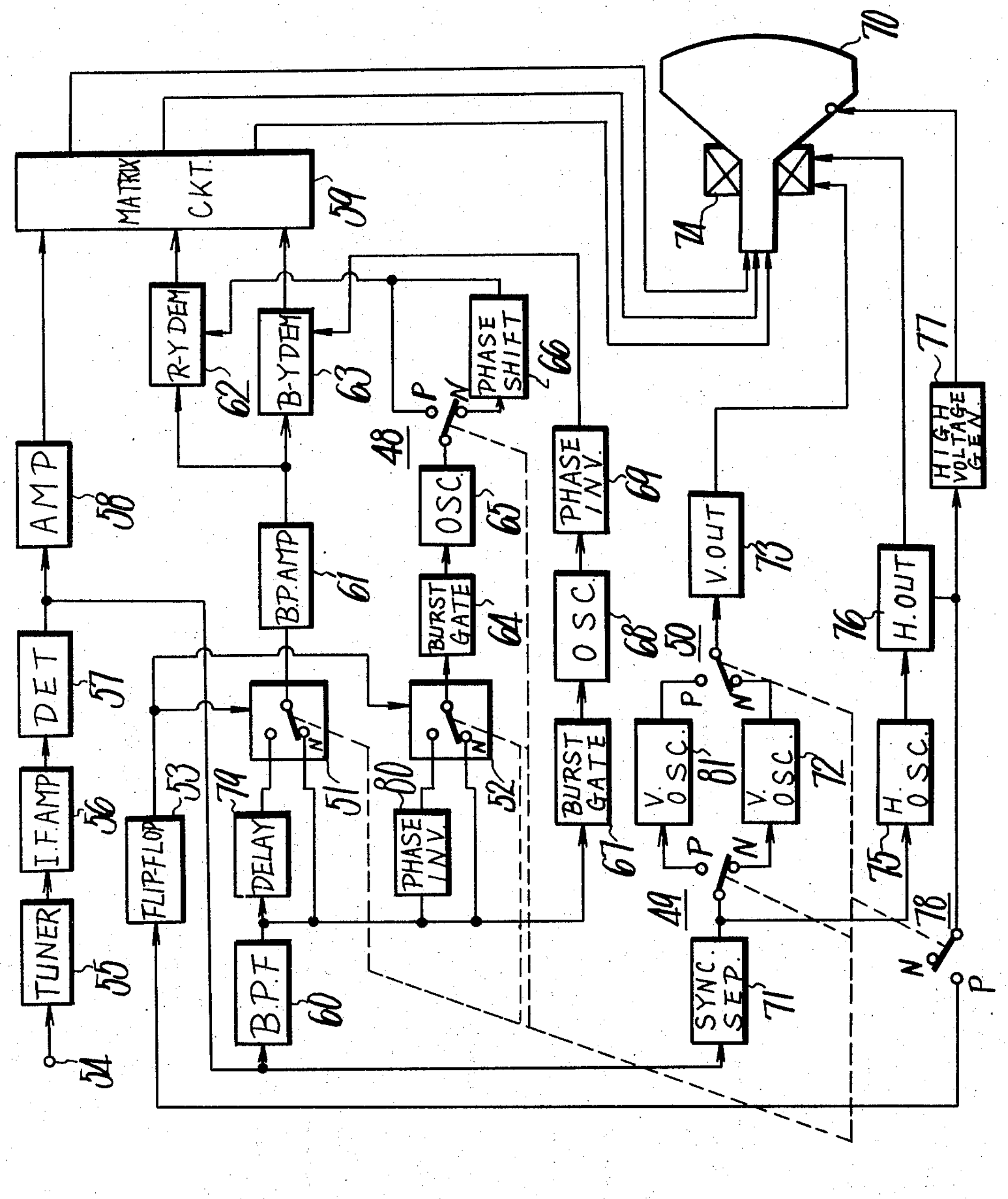
FIG. 6 is a systematic block diagram illustrating a color image display device which is employed in accordance with this invention for displaying a picture corresponding to the signal reproduced with the arrangement of FIG. 5.

The reproduced color television signal obtained at an output terminal 47 of mixer 39 may be supplied to a color image display device, for example, as shown on FIG. 6, and which is adapted to display color television pictures corresponding to the reproduced signal whether the original signal was an NTSC color television signal or a PAL color television signal.

As shown on FIG. 6, the color image display device according to this invention includes switches 48, 49, 50 and 78 which are disposed to engage their contacts N when the reproduced color television signal originated as an NTSC signal, and such switches are changed-over to engage their contacts P when the reproduced color television signal originated as a PAL signal. The display device is further shown to include switching circuits 51 and 52 which, in practice may be semi-conductor devices, and which are changed at every line interval by a flip-flop circuit 53, as hereinafter described, when the original color television signal is in accordance with the PAL system. However, when the reproduced signal originated as an NTSC signal, switching circuits 51 and 52 are maintained in the positions shown on FIG. 6 by suitably holding flip-flop circuit 53 in one of its conditions or states.

The reproduced color television signal obtained at the output terminal 47 of the magnetic reproducing system shown on FIG. 5 is supplied to an input terminal 54 and from the latter is applied to a tuner 55 wherein it is converted to a video intermediate frequency and then to a video intermediate frequency amplifier 56 and a video detector 57, in order, and the video detected output from video detector 57 is fed to a video amplifier 58. The luminance signal obtained from video amplifier 58 is applied to a matrix circuit 59. The output from video detector 57 is also fed to a band-pass filter 60 through which the chrominance signal is obtained.

In the case where the reproduced color television signal was originally in accordance with the NTSC system, its chrominance signal is obtained through the switching circuit 51 which is maintained in the position shown in FIG. 6 and then is fed through a band-pass amplifier 61 to demodulators 62 and 63 respectively. The chrominance signal from the band-pass filter 60 is also applied through switching circuit 52, which is also maintained in the position shown in FIG. 6, to a burst gate 64 which provides a burst signal. In the case where the reproduced signal originated as an NTSC signal, this coincides in phase with the -(R-Y) axis, and an oscillator 65 is driven by this burst signal to produce a reference signal which is equal to the burst signal in frequency and phase. Since the burst signal was converted to a frequency of 4.43MHz in the frequency converter 41 of the reproducing circuit of FIG. 5, the reference signal from oscillator 65 has that frequency and coincides, in phase, with the -(R-Y) axis. The reference signal thus produced is fed through te contact N of switch 48 to a phase shifter 66 from which a reference signal with a frequency of 4.43MHz and with its phase coinciding with the (R-Y) axis is applied to the demodulator 62. The chrominance signal from band-pass filter 60 is also fed to a burst gate circuit 67 by which a burst signal which is the same as that mentioned above is provided. The burst signal from gate 67 is applied to an oscillator 68 which produces a reference signal that is equal in frequency and phase to the burst signal and which is fed to a phase inverter 69. The phase inverter 69 produces a reference signal with a frequency of 4.43MHz and with its phase coinciding with the (B-Y) axis and which is fed to the demodulator 63. With such an arrangement, predetermined color difference signals can be derived from the demodulators 62 and 63 and applied to the matrix circuit 59 for coacting in the latter with the luminance signal from video amplifier 58 in producing three color signals at respective outputs from the matrix circuit 59. The three color signals thus obtained are applied to a conventional color television picture tube 70.

The output signal from the video detector 57 is also fed to a synchronizing signal separator 71 which separates a vertical synchronizing signal and applies this separated signal through the contact N of switch 49 to drive a vertical oscillator 72. The vertical oscillation output from vertical oscillator 72 has a frequency of 60Hz and is fed through the contact N of switch 50 to a vertical output circuit 73 which produces a corresponding vertical sweep signal applied to a deflection device or yoke 74 of the color television picture tube 70. The horizontal synchronizing signal obtained from the synchronizing signal separator 17 acts to drive a horizontal oscillator 75 which produces an oscillation output with a frequency of 15.75 KHz corresponding to the horizontal or line frequency of the original NTSC signal, and such oscillation output is applied to a horizontal output circuit 76 which produces a horizontal sweep signal applied to deflection yoke 74. A horizontal pulse signal from the horizontal output circuit 76 is fed to a high voltage generator 77 and the high voltage output of the latter is applied to the anode of picture tube 70.

With the circuit arrangement described above, the reproduced color television signal which originated as an NTSC, but which has had the frequency of its color subcarrier converted to 4.43MHz, is displayed as a color television picture on the screen of tube 70.

In the case where the reproduced color television signal was originally according to the PAL system, switches 48, 49, 50 and 78, which are ganged, as shown, are switched over to engage their respective contacts P. In that case, the luminance signal is applied from video amplifier 58 to matrix cricuit 59, as described above, and the chrominance signal from band-pass filter 60 is fed directly to one of the input terminals of switching circuit 51 and also to the other input terminal through a delay line 79 which delays the signal applied thereto by one line interval. Meanwhile, as will be described below, the horizontal pulse signal obtained from horizontal output circuit 76 is fed through the contact P of switch 78 to flip-flop circuit 53 to reverse the operation or state of the latter at every line interval and thereby to change over the switching circuits 51 and 52 with the signal from the flip-flop circuit 53 at every line interval. The output signal obtained from switching circuit 51, as before, is fed through band-pass amplifier 61 to demodulators 62 and 63. The chrominance signal from band-pass filter 60 is also fed directly to one of the input terminals of switching circuit 52 and to the other input terminal thereof through a phase inverter 80. As mentioned above, switching circuit 52 is also changed over by the output signal from flip-flop circuit 53 at every line interval in ganged relation with switching circuit 51. The output signal from switching circuit 52, as before, is fed to burst gate circuit 64 and the burst signal from the latter drives oscillator 65. The reference signal from oscillator 65 is fed directly through the contact P of switch 48 to demodulator 62. The chrominance signal from band-pass filter 60 is also fed to burst gate 67 which then applies the burst signal to oscillator 68 to drive the latter. The reference signal from oscillator 68 is applied through phase inverter 69 to demodulator 63.

Figure 7:
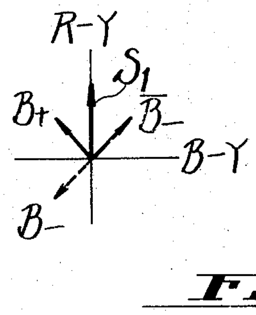
FIGS. 7, 8 and 9 are vector diagrams to which reference will be made in explaining the operation of the image display device of FIG. 6.

Accordingly, when a chrominance signal (referred to hereinbelow as a plus signal), which has a color subcarrier modulated with a red color difference signal and with a phase coinciding to the (R-Y) axis, is derived from band-pass filter 60, both switching circuit 51 and 52 are changed over to the positions shown in FIG. 6. On the other hand, when a chrominance signal (hereinafter referred to as a minus signal), which has a color subcarrier modulated with the red color difference signal and with a phase coinciding with the -(R-Y) axis, is derived from band-pass filter 60, switching circuits 51 and 52 are changed over to the positions which are the reverse of those shown on FIG. 6. Thus, when switching circuit 51 receives the minus signal, such signal is replaced with the plus signal having occurred one line interval earlier and having been delayed by that interval in delay line 79 so that only the plus signal is sequentially delivered by switching circuit 51 and applied to demodulators 62 and 63. Further, in this case, that is, when switching circuit 52 is repeatedly changed-over by flip-flop 53, the burst signal B+ in the plus signal and the reversed burst signal $\overline{B-}$ which is obtained by reversing the phase of the burst signal B− in the minus signal, as shown in FIG 7, are alternately delivered from burst gate 64, so that a reference signal $S_1$, with a frequency of 4.43MHz and with a phase coinciding with the (R-Y) axis midway between signals B+ and $\overline{B-}$, as shown in FIG. 7 is derived from oscillator 65, and such signal $S_1$ is then applied to demodulator 62.

Figure 8:
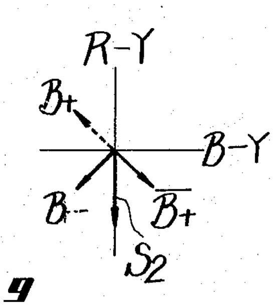
Figure 9:
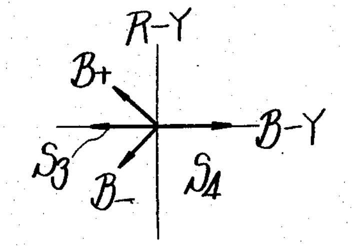

In the event that the switching circuits 51 and 52 are changed over to the positions that are the reverse of those shown in FIG. 6 when the plus signal is derived from band-pass filter 60 and are disposed in the positions shown in FIG. 6 when the minus signal is derived from band-pass filter 60, only the minus signal is sequentially applied from switching circuit 51 through band-pass amplifier 61 to demodulators 62 and 63. In the case being now described, each plus signal is replaced, at the output of switching circuit 51, by the preceding minus signal which was delayed in line 79 by one line interval. The reversed burst signal $\overline{B+}$, which is obtained by reversing the burst signal B+ in phase inverter 80, and the burst signal B− (FIG. 8) are alternately derived from burst gate 64. Accordingly, a reference signal $S_2$ with a frequency of 4.43MHz and with its phase coinciding with the -(R-Y) axis midway between signals $\overline{B+}$ and B−, as shown in FIG. 8, is obtained from oscillator 65 and such reference signal $S_2$ is applied to demodulator 62. The burst gate 67 alternately delivers the burst signals B+ and B−, as shown in FIG. 6, so that a reference signal $S_3$, with a frequency of 4.43MHz and its phase coinciding with the -(B-Y) axis midway between burst signals B+ and B−, is always supplied from oscillator 68 to phase inverter 69 which, in turn, supplies to demodulator 63 a reference signal $S_4$, with the same frequency as reference signal $S_3$ and its phase coinciding with the (B-Y) axis. In either case, with the circuit shown in FIG. 6, predetermined demodulated color difference signals can be sequentially supplied from demodulators 62 and 63 to matrix circuit 59, and hence predetermined color signals are supplied to color picture tube 70 from matrix circuit 59.

Further, when displaying a picture in response to a reproduced signal that was originally a PAL color television signal, the vertical synchronizing signal derived from synchronizing signal separator 71 is fed through the contact P of switch 49 to another vertical oscillator 81 which then produces a vertical oscillation output with a frequency of 50Hz that is applied through the contact P of switch 50 to vertical output circuit 73. The resulting vertical sweep signal from vertical output circuit 73 which has the PAL field frequency is applied to deflection yoke 74. The horizontal synchronizing signal from separator 71 is fed to horizontal oscillator 75 as previously described, and the oscillator 75 is driven thereby to produce a horizontal oscillation output signal with the PAL horizontal or line frequency of 15.63 KHz which is fed to horizontal output circuit 76. The horizontal sweep signal from circuit 76 is fed to the deflection yoke 74. The high voltage output from high voltage generator 77 is applied to the anode of picture tube 70.

With the arrangement described above, the reproduced color television signal originating as a PAL signal can be displayed on the screen of picture tube 70 as a color picture.

Although the horizontal frequency of the NTSC color television signal differs from that of the PAL color television signal, the horizontal oscillator 75 can follow either of these frequencies since the difference therebetween is very small.

Figure 10:
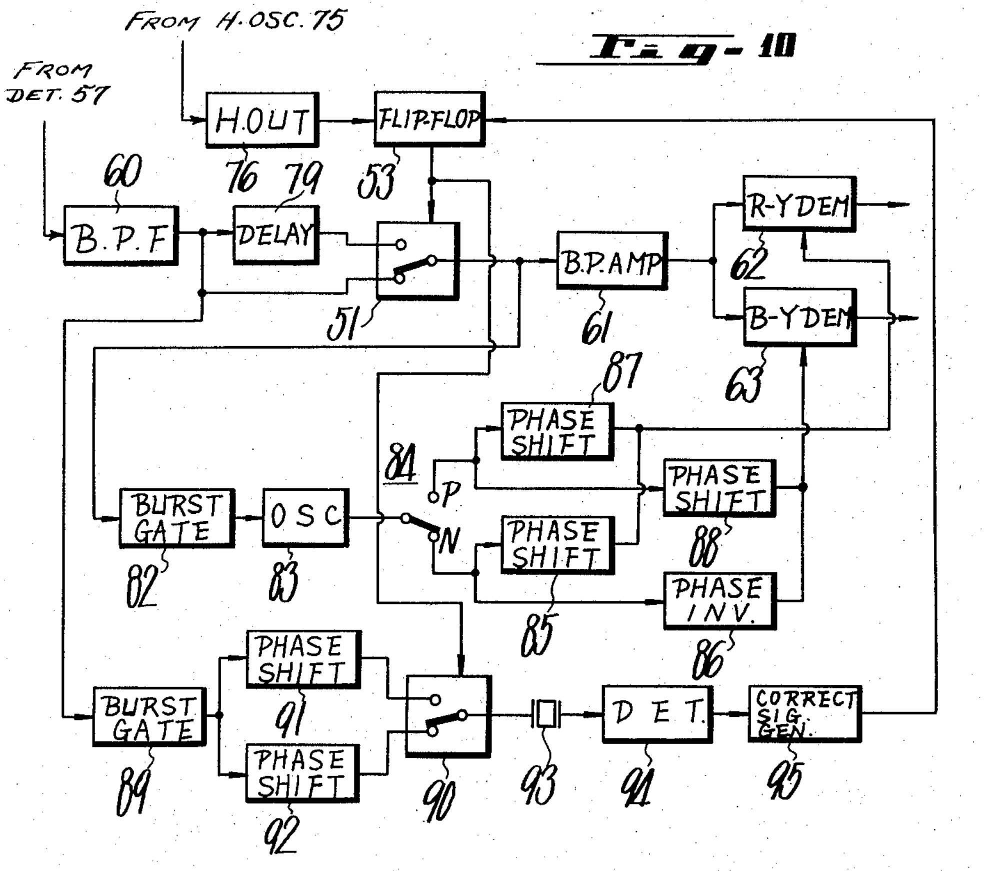
FIG. 10 is a systematic block diagram illustrating a modification of part of the color image display device of FIG. 6.

FIG. 10 shows another embodiment of the color demodulator portions of a color image display device according to this invention which is otherwise similar to that described in connection with FIG. 6, and in which the horizontal pulse signal is applied to flip-flop circuit 53 so as to change over switching circuit 51 at every line interval when displaying reproduced signals that originated as either NTSC signals or PAL signals. In the circuit of FIG. 10, the signal from switching circuit 51 is fed to a burst gate 82 to separate the burst signal which is then applied to an oscillator 83 to drive the latter. In the case where the reproduced color teevision signal originated as an NTSC signal, the output signal from oscillator 83 is fed through the contact N of a switch 84 and a phase shifter 85, which retards the phase of the signal fed thereto by 90°, to demodulator 62 and also through a phase inverter 8 to demodulator 63. In the case where the reproduced color television signal originated as a PAL signal, switch 84 is changed over to engage its contact P and the output signal from oscillator 83 is thereby fed through a phase shifter 87, which delays the phase of the signal applied thereto by 45°, to demodulator 62 and also through a phase shifter 88, which delays the phase of the signal applied thereto by 135°, to demodulator 63.

In the embodiment of FIG. 10, when the reproduced color television signal originated as a PAL signal, the reversing operation of flip-flop circuit 53 controls the switched condition of switching circuit 51 so that a predetermined relationship is maintained between such switched condition and the chrominance signal from band-pass filter 60 by which the plus signal is always applied to demodulators 62 and 63. In order to achieve the foregoing, the chrominance signal from band-pass filter 60 is fed to a burst gate 89 which detects the burst signal and applies the same through a phase shifter 91, which delays the phase of the signal applied thereto by 45°, to one of the input terminals of a switching circuit 90 and through a phase shifter 92, which advances the phase of the signal applied thereto by 45°, to the other input terminal of switching circuit 90. The switching circuit 90 is changed over at every line interval with the output signal from flip-flop circuit 53 in ganged relation with switching circuit 51 in such a manner that, when switching circuit 51 is in the position shown in FIG. 10, switching circuit 90 is in the position shown in that figure. The output signal from switching circuit 90 is fed to an oscillator 93, such as a quartz crystal, to produce a continuous wave signal which is then fed to a detector 94. The detected output from the detector 94 is applied to a correcting signal generating circuit 95 which produces a correcting signal only when detector 94 produces no output signal and applies the correcting signal to flip-flop circuit 53 for inverting the operation thereof.

Figure 11:
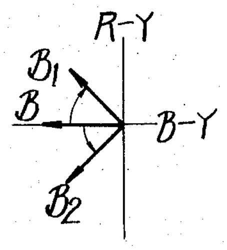
FIGS. 11, 12 and 13 are vector diagrams to which reference will be made in explaining the operation of the modified image display device depicted in FIG. 10.

Since the burst signal B, which has a phase always coinciding with the -(B-Y) axis as shown in FIG. 11, is derived from burst gate 89, in the case where the reproduced color television signal originated as an NTSC signal, the signal $B_1$ with the phase retarded by 45° from the -(B-Y) axis and the signal $B_2$ with the phase advanced by 45° in respect to the -(B-Y) axis are alternately applied by switching circuit 90 to quartz crystal oscillator 93 with the result that oscillator 93 always delivers a continuous wave signal having its phase coinciding with the -(B-Y) axis midway between signals $B_1$ and $B_2$. Accordingly, a predetermined detected output signal is delivered by detector 94 to correcting signal generating circuit 95 so that the latter does not produce a correcting signal. In the foregoing case, flip-flop circuit 53 carries out its reversing operation freely in accordance with the horizontal pulse signal from horizontal output circuit 76. During the resulting changing-over of switching circuit 51, the chrominance signal is fed alternately, either directly from band pass filter 60 or by way of delay line 79, through switching circuit 51 and bandpass amplifier 61 to the demodulators 62 and 63. The burst signal B with its phase always coinciding with the -(B-Y) axis is obtained from burst gate 82 and hence the reference signal with the same phase as the burst signal B is obtained from oscillator 83 and applied to phase shifter 85 and phase inverter 86. As a result, demodulator 62 is supplied by phase shifter 85 with the reference signal with its phase coinciding with the (R-Y) axis, and demodulator 63 is supplied by phase inverter 86 with the reference signal with its phase coinciding with the (B-Y) axis. The demodulators 62 and 63, therefore, deliver the predetermined demodulated color difference signals (R-Y) and (B-Y).

Figure 12:
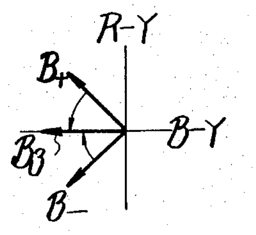

In the case where the reproduced color television signal originated as a PAL signal, and assuming that switching circuit 51 is disposed in the position shown in FIG. 10 when the plus signal is delivered from band-pass filter 60 and is changed over to the reverse position when the minus signal is derived from the band-pass filter 60, then the plus signal is always fed through switching circuit 51 to demodulators 62 and 63. In the case of the above assumption, switching circuit 90 is also disposed in the position shown in FIG. 10 when the plus signal is derived from band-pass filter 60 and is changed over to the reverse position when the minus signal is obtained from band-pass filter 60. Thus, quartz crystal oscillator 93 is alternately supplied by way of switching circuit 90 with the signal, which is advanced in phase by 45° from the burst signal B+, and the signal, which is delayed in phase by 45° from the burst signal B−, as shown in FIG. 12. In other words, quartz crystal oscillator 93 is supplied with the signal $B_3$ (FIG. 12) which always coincides in phase with the -(B-Y) axis, and hence oscillator 93 produces successive wave signals having the same phase. The detector 94 which is supplied with the successive wave signals from oscillator 93 produces a predetermined output signal which is fed to correcting signal generating circuit 95 so that no correcting signal is produced by circuit 95 at this time. As a result of this, the reversing operation of flip-flop circuit 53 and the resulting changing-over of switching circuits 51 and 90 are maintained as described above with the result that modulators 62 and 73 are supplied with the plus signal continuously.

Figure 13:
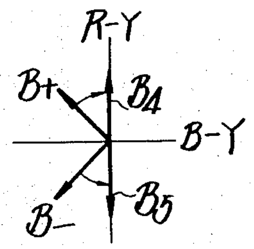

However, if the reversing operation of flip-flop circuit 53 is the reverse of that described above, that is, if switching circuit 51 is changed over to the position which is the reverse of that shown on FIG. 10 when the plus signal is delivered from bandpass filter 60 and switching circuit 51 is in the position shown in FIG. 10 when the minus signal is delivered from band-pass filter 60, then the minus signal is continuously fed to demodulators 62 and 63 from the switching circuit 51, as described above. In that case, switching circuit 90 is also changed over to the position which is the reverse of that shown in FIG. 10 when the plus signal is delivered from band-pass filter 60 and switching circuit 90 is in the position shown in FIG. 10 when the minus signal is delivered from filter 60. As a result of the foregoing, quartz cyrstal oscillator 93 is alternately supplied through switching circuit 90 with a signal $B_4$, which is delayed in phase by 45° from the burst signal B+ and which coincides in phase with the (R-Y) axis, and a signal $B_5$, which is advanced in phase by 45° from the burst signal B− and which coincides in phase with the -(R-Y) axis, as shown in FIG. 13. Accordingly, under the last described operating conditions, oscillator 93 delivers no output to detector 94, and hence the detector 94 delivers no output to circuit 95, so that the correcting signal generating circuit 95 produces a correcting signal. Such correcting signal is fed to flip-flop circuit 53 to reverse the operation of the latter and hence the switching operation of the switching circuits 51 and 90. The reversing of operation of flip-flop circuit 53 and of switching circuits 51 and 90 in relation to the chrominance signal delivered from band-pass filter 60 ensures that only the plus signal will be supplied to demodulators 62 and 63.

When demodulators 62 and 63 are again always supplied with the plus signal, the burst signal B+ in the plus signal is sequentially obtained from burst gate 82 and the reference signal of the same phase is obtained from oscillator 83, so that demodulator 62 is supplied by phase shifter 87 with the reference signal having its phase coinciding with (R-Y) axis and the demodulator 63 is supplied by phase shifter 88 with the reference signal having its phase coinciding with the (B-Y) axis. Accordingly, the predetermined demodulated color difference signals are respectively obtained from demodulators 62 and 63.

Further, in the case of the embodiment of FIG. 10, in which the chrominance signal in the reproduced color television signal is obtained at every other line interval through the delay line 79 whether the reproduced signal originated as an NTSC signal or a PAL signal, the difference between the horizontal frequencies of the NTSC and PAL signals may give rise to a problem. Accordingly, in the embodiment of FIG. 10, it is preferred that the delay time of delay line 79 be selected to be 64 micro-seconds, which is the horizontal period of the PAL color television signal, and that, when an NTSC color television signal is being reproduced, the transporting speed of the tape 6 by capstan 7 in the magnetic recording and reproducing apparatus is suitably reduced to a slight extent as compared with the tape transporting speed for reproducing a PAL color television signal, whereby to provide the reproduced color television signal with a horizontal period of 64 micro seconds even though such reproduced signal originated as an NTSC signal.

As is apparent from the above, in accordance with the present invention the color television signals formed in accordance with different systems, such as the NTSC and PAL systems, can be recorded and reproduced by a common magnetic recording and reproducing apparatus, and further the reproduced color television signals can be displayed as pictures on the screen of the same color image display device. Systems in accordance with the present invention are especially suitable for use in connection with magnetic tape contained in a cassette or magazine.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention.

What is claimed is:

1. A system for selectively recording and/or reproducing NTSC and PAL color television signals respectively having first and second different standard field frequencies and first and second different standard color subcarrier frequencies of the chrominance signal portions thereof, comprising a. rotary magnetic head means for selectively recording and reproducing signals on a magnetic tape;

b. means for selectively rotating said head means at speeds respectively corresponding to said first and second different field frequencies of the NTSC or PAL signals to be recorded and/or reproduced;

c. recording circuit means including reference signal generating means operable to selectively produce first and second reference signals having respective frequencies that differ from each other by the difference between said first and second standard color subcarrier frequencies, frequency-converting means receiving said chrominance signal portion of the NTSC or PAL color television signal to be recorded and a corresponding selected one of said first and second reference signals for frequency-converting the color subcarrier frequency of said chrominance signal portion to a first predetermined subcarrier frequency that is lower than the standard color subcarrier frequency of either of said signals to be recorded, and means for applying the frequency-converted chrominance signal portion to said head means for recording by the latter on the magnetic tape; and d. reproducing circuit means including reference signal generating means operable to produce a third reference signal, and frequency-reconverting means receiving said third reference signal and the chrominance signal portion reproduced from the tape by said head means and reconverting the color subcarrier frequency of said reproduced chrominance signal portion to a second predetermined subcarrier frequency, whereby the frequency-reconverted chrominance signal portion has its original field frequency and said second predetermined subcarrier frequency regardless of said standard color subcarrier frequency of the NTSC or PAL color television signal prior to recording.

2. A system according to claim 1; wherein said reference signal generating means of said recording circuit means includes first and second oscillators respectively producing said first and second reference signals having different frequencies, switching means for deriving said selected one of said first and second reference signals from the corresponding oscillator in accordance with the standard color subcarrier frequency of the signal to be recorded, and means for supplying the derived reference signal to said frequency-converting means.

3. A system according to claim 1; wherein said recording circuit means further includes means for separating a luminance signal portion from the remainder of the color television signal to be recorded means for frequency modulating said separated luminance signal portion, said first predetermined subcarrier frequency being selected so that the band width of said frequency-converted chrominance signal portion is below the band width of the frequency-modulated luminance signal portion, and means for combining said frequency-modulated luminance signal portion with said frequency-converted chrominance signal portion prior to application of the resulting combined signal to said head means; and wherein said reproducing circuit means further includes means for separating the reproduced frequency-modulated luminance signal portion from the remainder of the signal reproduced by said head means, means for demodulating the separated frequency-modulated luminance signal portion, and means for combining the demodulated luminance signal portion with said frequency-reconverted chrominance signal portion to provide a reproduced color television signal.

4. A system according to claim 1; further comprising color image display means including a color image display tube having scanning means and circuit means receiving said frequency-reconverted chrominance signal portion for causing said tube to display a color image corresponding thereto irrespective of the standard field frequency and color subcarrier frequency of the color television signal which was recorded and then reproduced.

5. A system according to claim 4; wherein said circuit means of the color image display means includes delay means for delaying the received chrominance signal portion for substantially one line interval to produce a delayed replica of said received chrominance signal portion, switching means for alternately passing, in successive line intervals, said delayed replica and said received chrominance signal portion to produce a reformed chrominance signal portion identical in duration to said received chrominance signal portion, demodulating means receiving said reformed chrominance signal portion and producing corresponding color signals for operating said color image display tube, and means operative in response to said received chrominance signal portion for producing scanning signals controlling said scanning means of the image display tube in accordance with the field and line frequencies of said received chrominance signal portion.

6. A system according to claim 5; in which said circuit means of the image display means includes switch control means actuable when an NTSC signal is recorded to halt the switching operation of said switching means so that the latter passes said received chrominance signal portion during all of said line intervals.

7. A system according to claim 6; in which said circuit means of the image display means further includes means for extracting a burst signal from said received chrominance signal portion, demodulating reference signal generating means driven by the extracted burst signal for producing a first demodulating reference signal, phase inverting means for inverting the phase of said first demodulating reference signal and supplying the resulting phase-inverted first demodulating reference signal to one of said demodulating means, phase-inverting means for inverting the phase of said received chrominance signal portion and producing a phase-inverted chrominance signal portion, second switching means ganged with the first mentioned switching means and being effective, during said switching operation of the latter, to alternately pass, in successive line intervals, said phase-inverted chrominance signal portion and said received chrominance signal portion and thereby produce a second reformed chrominance signal portion identical in duration to said received chrominance signal portion, means for extracting a burst signal from said reformed second chrominance signal portion, second demodulating reference signal generating means driven by the last mentioned extracted burst signal for producing a second demodulating reference signal, and second switch control means supplying said second demodulating reference signal directly to another of said demodulating means during operation of said first and second switch means when a PAL signal is recorded and being changed-over to supply said second demodulating reference signal to said other demodulating means by way of phase shifting means when an NTSC signal is recorded and said first switching means has its operation halted by the first mentioned switch control means.

8. A system according to claim 5; in which said circuit means of the image display means includes means for extracting a burst signal from said reformed chrominance signal, demodulating reference signal generating means driven by the extracted burst signal for producing a demodulating reference signal, control switch means receiving said demodulating reference signal and being actuable to first and second positions when NTSC and PAL signals are respectively recorded, phase-shifting means and phase-inverting means receiving said demodulating reference signal from said control switch means in said first position and respectively supplying phase-shifted and phase-inverted demodulating reference signals to one of said demodulating means and to another of said demodulating means, and second and third phase-shifting means receiving said demodulating reference signal from said control switch means in said second position of the latter and being operative to delay the phase of said demodulating reference signal by different phase angles for supplying different phase-delayed demodulating reference signals to said one demodulating means and said other demodulating means, respectively.

9. A system for selectively recording and/or reproducing color television signals respectively having different standard field frequencies and different standard color subcarrier frequencies of the chrominance signal portions thereof, comprising a. rotary magnetic head means for selectively recording and reproducing signals on a magnetic tape;

b. means for selectively rotating said head means at speeds respectively corresponding to said different field frequencies of the signals to be recorded and/or reproduced;

c. recording circuit means including reference signal generating means operable to produce first and second reference signals having different frequencies, frequency-converting means receiving said chrominance signal portion of the color television signal to be recorded and a corresponding selected one of said first and second reference signals for frequency-converting the color subcarrier frequency of said chrominance signal portion to a first predetermined subcarrier frequency that is lower than the standard color subcarrier frequency of said signal to be recorded, and means for applying the frequency-converted chrominance signal portion to said head means for recording by the latter on the magnetic tape;

d. reproducing circuit means including frequency-reconverting means receiving the chrominance signal portion reproduced from the tape by said head means and reconverting the color subcarrier frequency of said reproduced chrominance signal portion to a second predetermined subcarrier frequency, whereby the frequency-reconverted chrominance signal portion has its original field frequency and said second predetermined subcarrier frequency regardless of said standard color subcarrier frequency of the color television signal prior to recording; and e. color image display means including a color image display tube having scanning means and circuit means receiving said frequency-reconverted chrominance signal portion for causing said tube to display a color image corresponding thereto irrespective of the standard field frequency and color subcarrier frequency of the color television signal which was recorded and then reproduced, said circuit means of the color image display means including delay means for delaying the received chrominance signal portion for substantially one line interval to produce a delayed replica of said received chrominance signal portion, switching means for alternately passing, in successive line intervals, said delayed replica and said received chrominance signal portion to produce a reformed chrominance signal portion identical in duration to said received chrominance signal portion, demodulating means receiving said reformed chrominance signal portion and producing corresponding color signals for operating said color image display tube, means operative in response to said received chrominance signal portion for producing scanning signals controlling said scanning means of the image display tube in accordance with the field and line frequencies of said received chrominance signal portion, means for extracting a burst signal from said reformed chrominance signal, reference signal generating means driven by the extracted burst signal for producing a demodulating reference signal, control switch means receiving said demodulating reference signal and being actuable to first and second positions, phase-shifting means and phase-inverting means receiving said demodulating reference signal from said control switch means in said first position and respectively supplying phase-shifted and phase-inverted demodulating reference signals to one of said demodulating means and to another of said demodulating means, second and third phase-shifting means receiving said demodulating reference signal from said control switch means in said second position of the latter and being operative to delay the phase of said reference signal by different phase angles for supplying different phase-delayed reference signals to said one demodulating means and said other demodulating means, respectively, means for extracting a burst signal from said received chrominance signal portion, phase-shifting means receiving the last mentioned burst signal and producing phase-advanced and phase-delayed replicas thereof, second switching means ganged with the first mentioned switching means for alternately passing, in successive line intervals, said phase-advanced and phase-delayed replicas of the burst signal, oscillating means driven by the output of said second switching means, and correcting signal generating means operable when no output is derived from said oscillating means to invert the switching operation of said first and second switching means.

10. A system according to claim 3; further comprising color image display means including a color image display tube having scanning means, means receiving said reproduced color television signal for producing scanning signals controlling said scanning means of the image display tube in accordance with the field and line frequencies of said reproduced color television signal, means receiving the frequency-reconverted chrominance signal portion of said reproduced color television signal for providing a chrominance signal which is unchanged in phase in successive line intervals when NTSC and PAL signals are respectively recorded, first and second demodulating means receiving said chrominance signal which is unchanged in phase, demodulating signal generating means supplying to said first and second demodulating means first and second demodulating signals which have said second predetermined subcarrier frequency and which selectively have the phases of said first and second color difference signals in said chrominance signal which is unchanged in phase when NTSC and PAL signals are respectively recorded, whereby said first and second demodulating means respectively produce said first and second color difference signals, and means receiving said first and second color difference signals for causing said tube to display a color image corresponding thereto.

11. A system according to claim 10; in which said means for providing a chrominance signal which is unchanged in phase includes delay means for delaying the frequency-reconverted chrominance signal portion of the reproduced color television signal for substantially one line interval to produce a delayed replica of said frequency-reconverted chrominance signal portion, switching means operative at least when a PAL signal is recorded for alternately passing, in successive line intervals, said delayed replica and said frequency-reconverted chrominance signal portion to produce said chrominance signal which is unchanged in phase and identical in duration to said frequency-reconverted chrominance signal portion.

12. A system according to claim 11; in which switch control means is actuable, when an NTSC is recorded, to halt the switching operation of said switching means so that the latter passes said frequency-reconverted chrominance signal portion of the reproduced color television signal during all of said line intervals.

13. A system according to claim 12; in which said demodulating signal generating means includes means for extracting a burst signal from said chrominance signal portion of the reproduced color television signal, reference signal generating means driven by the extracted burst signal for producing a first demodulating reference signal at said second predetermined sub-carrier frequency, phase inverting means for inverting the phase of said first demodulating reference signal and supplying the resulting first demodulating signal to said first demodulating means, phase-inverting means for inverting the phase of said chrominance signal portion of the reproduced color television signal and producing a phase-inverted chrominance signal portion, second switching means ganged with the first mentioned switching means and being effective, during said switching operation of the latter when a PAL signal is recorded, to alternately pass, in successive line intervals, said phase-inverted chrominance signal portion and said chrominance signal portion of the reproduced color television signal, means for extracting a burst signal from the output of said second switching means, means for producing a second demodulating reference signal from the last mentioned burst signal and which also has said second predetermined subcarrier frequency, and second switch control means operative, when a PAL signal is recorded, to supply said second demodulating reference signal to said second demodulating means as said second demodulating signal therefor, said second switch control means being actuable, when an NTSC signal is recorded, to supply said second demodulating reference signal to phase shifting means which produces said second demodulating signal.

14. A system according to claim 11; in which said switching means is operative when NTSC and PAL signals are recorded, and said demodulating signal generating means includes means for extracting a burst signal from said chrominance signal which is unchanged in phase, reference signal generating means driven by the extracted burst signal for producing a demodulating reference signal, control switch means receiving said demodulating reference signal and being actuable to first and second positions when NTSC and PAL signals are respectively recorded, phase-shifting means and phase-inverting means receiving said demodulating reference signal from said control switch means in said first position and respectively supplying said first and second demodulating signals to said first and second demodulating means, and second and third phase-shifting means receiving said demodulating reference signal from said control switch means in said second position of the latter and being operative to delay the phase of said demodulating reference signal by different phase angles for supplying said first and second demodulating signals to said first and second demodulating means, respectively.

15. A system according to claim 14, means are provided for extracting a burst signal from said chrominance signal portion of the reproduced color television signal, phase-shifting means receive the last mentioned burst signal and produce phase-advanced and phase-delayed replicas thereof, second switching means is ganged with the first mentioned switching means for alternately passing, in successive line intervals, said phase-advanced and phase-delayed replicas of the burst signal, oscillating means is driven by the output of said second switching means, and correcting signal generating means is operable when no output is derived from said oscillating means to invert the switching operation of said first and second switching means.

* * * * *